(12) United States Patent
Bini et al.

(10) Patent No.: US 12,352,636 B2
(45) Date of Patent: Jul. 8, 2025

(54) TEMPERATURE PROBE AND METHOD FOR MANUFACTURING A TEMPERATURE PROBE

(71) Applicant: Endress+Hauser Wetzer GmbH+Co. KG, Nesselwang (DE)

(72) Inventors: Christian Bini, Cassina dei Pecchi (IT); Shakil Ahmed, Pioltello (IT); Massimo Del Bianco, Monza (IT)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 390 days.

(21) Appl. No.: 18/066,431

(22) Filed: Dec. 15, 2022

(65) Prior Publication Data
US 2023/0194357 A1 Jun. 22, 2023

(30) Foreign Application Priority Data
Dec. 16, 2021 (EP) ..................................... 21215112

(51) Int. Cl.
*G01K 7/18* (2006.01)
*G01K 1/02* (2021.01)
(Continued)

(52) U.S. Cl.
CPC ............... *G01K 7/18* (2013.01); *G01K 1/026* (2013.01); *G01K 1/08* (2013.01); *H01B 5/02* (2013.01);
(Continued)

(58) Field of Classification Search
CPC . G01K 7/18; G01K 1/026; G01K 1/08; H01B 5/02; H01R 11/18
See application file for complete search history.

(56) References Cited

U.S. PATENT DOCUMENTS 3,921,450 A * 11/1975 Pfister ................... G01F 23/246
338/24
5,088,835 A * 2/1992 Shigezawa ............. G01K 7/025
374/E7.006
(Continued)

FOREIGN PATENT DOCUMENTS

CN 112525367 A 3/2021
JP 6150971 * 6/2017 ............... G01K 1/08

OTHER PUBLICATIONS

JP-6150971 translation (Year: 2017).*
CN-112525367 translation (Year: 2022).*

*Primary Examiner* — Kyung S Lee
(74) *Attorney, Agent, or Firm* — Mark A. Logan; Endress+Hauser (USA) Holding, Inc.

(57) ABSTRACT

A temperature probe for determining the temperature according to the three-point probe method includes a three-wire line several meters long consisting of a first connecting line, a second connecting line, and a third connecting line connected to sensor element. The connecting lines are made of a first material and serve to transmit energy and the measured temperature values. A conductive element made of a second material is inserted in the second connecting line and in the third connecting line. The resistivity of said second material is higher than the resistivity of the first material. The two inserted conductive elements are designed such that the second connecting line and the third connecting line have the same resistance as the first connecting line. Additionally, the present disclosure refers to a method describing the manufacture of a temperature probe.

12 Claims, 5 Drawing Sheets

(51) Int. Cl.
  *G01K 1/08*   (2021.01)
  *H01B 5/02*   (2006.01)
  *H01R 11/18*  (2006.01)

(52) U.S. Cl.
  CPC ......... *H01R 11/18* (2013.01); *G01K 2217/00* (2013.01); *H01R 2201/20* (2013.01)

(56) References Cited

U.S. PATENT DOCUMENTS

2016/0252404 A1   9/2016  Terada et al.
2023/0194357 A1*  6/2023  Bini ....................... G01K 1/026
                                                          338/28

\* cited by examiner

| MgO Length | Total Resistance | Resistance difference (3σ=99,7%) | Equivalent Pt100 temperature error | excitation current |
|---|---|---|---|---|
| m | Ohm | Ohm | °C | |
| 10 | 0.5 | 0.02 | 0.038 | |
| 20 | 1.0 | 0.03 | 0.077 | |
| 30 | 1.5 | 0.05 | 0.115 | |
| 40 | 2.0 | 0.06 | 0.154 | limit class A |
| 50 | 2.5 | 0.08 | 0.192 | |
| 60 | 3.0 | 0.09 | 0.231 | |
| 70 | 3.5 | 0.11 | 0.269 | |
| 80 | 4.0 | 0.12 | 0.308 | limit class B |
| 90 | 4.5 | 0.14 | 0.346 | |
| 100 | 5.0 | 0.15 | 0.385 | |
| 110 | 5.5 | 0.17 | 0.423 | |

| Material | Resistivity |
|---|---|
| | Ohm*m |
| Copper | 1.68E-08 |
| Nickel | 7.80E-08 |
| Costantan | 5.00E-07 |
| Iron | 8.70E-08 |

TEMPERATURE PROBE AND METHOD FOR MANUFACTURING A TEMPERATURE PROBE

CROSS-REFERENCE TO RELATED APPLICATION

The present application is related to and claims the priority benefit of European Patent Application No. 21215112.0, filed on Dec. 16, 2021, the entire contents of which are incorporated herein by reference.

TECHNICAL FIELD

The present disclosure is related to a temperature probe for highly accurate measurements.

BACKGROUND

Thermometers with resistance elements often include so-called thin-film sensor elements, Resistance Temperature Detectors (RTD). Typically, such a sensor element has a carrier substrate that is provided with lead wires and is metallically coated on a front surface. A metallic coating may also be available on the rear surface. Platinum elements are often used as sensor elements, which are also commercially available under the designations PT10, PT100, and PT1000, among others. In many cases, the sensor elements are encapsulated or embedded, preferably in pure ceramic powders, and the connecting leads are guided in a guide tube to electronics, for example a temperature transmitter. Details of industrial platinum resistance thermometers can be found, for example, in the European standard EN60751.

Various measuring methods for determining the temperature by means of a resistance element have become known from the prior art. A transmit signal, usually in the form of an electric current, is impressed into the sensor element and a receive signal, usually in the form of a voltage dropped across the sensor element, is detected, and evaluated with respect to temperature.

In the simplest case, the temperature is determined by means of a temperature-dependent resistance, in which the sensor element is simply contacted via two connecting wires. The disadvantage of this solution is that the resistance of the connecting wires is included in the temperature determination as an error. According to another method, the sensor element is contacted via three connecting wires. By tapping the falling voltage in pairs between two of the three connecting wires in each case, a resistance of the connecting wires or the connecting lines can be largely compensated, if it can be assumed that the three connecting wires have the same resistance. It is also known to measure the temperature with four connecting wires.

RTD Pt100 temperature sensors are widely used as sensor elements in process monitoring. They are the most common used standard temperature sensors in the market. In certain application of process automation very long sensors are required to reach the zone where the temperature should be detected and/or monitored. Such temperature sensors can have a total length up to a hundred of meters.

In such an application, the sensor cable must ensure the necessary robustness. Usually, it is made by an MgO cable with an external metal protection sheath. The protection sheath is usually made of stainless steel or nickel alloy. A certain number of conductive wires, in most applications copper wires, form the connection wires for connecting the temperature sensor to electronics.

The best-known solution of measuring the temperature in the case of very long temperature probes consists in measuring the electric resistance of the Pt100 probe by a 4 wires terminal sensing. This so-called 4-points-probe-method consists in injecting a current by using two wires and measuring the voltage by using the remaining two wires as it is schematically described in FIG. 1. The advantage of this measuring method is that the measurement is not affected by the resistance of the connection wires between the probe and electronics of the temperature probe and therefore the measurement is independent of the length of the connection cable.

Another very common measuring method requested by the market is the 3 wires terminal sensing, 3-wires-connection, or 3 points probe method. Generally, this method is requested to reduce the costs of the temperature measuring device, or for design reasons: indeed, in probes with multiple sensing elements (two or more), the reduction of the number of necessary wires in the cable has the benefit to make the cable more compact (smaller diameter and so less invasive) or allows to increase the number of possible measuring points in the same cable.

Compared to the 4 wires, this method has an essential limit: the measurement can compensate the resistance of the connection wires without any additional error only if the resistance of the cable is the same in all three cables used in the measuring device.

This limit can easily be demonstrated by analyzing how the measurement is performed—see FIG. 2:

In this case the resistance of the Pt100 probe is the result of the resistances of two loops:

In one circuit the resistance Rc1 is measured between the common connection point C and the point 1:

$Rc1 = R\ \text{common} + R1 + R\ Pt100.$

Then the measurement is made between points 1 and 2:

$Rc2 = R1 + R2$

Under the assumption that the three connection resistances are the same the result is calculated as:

$\text{Measurement} = Rc1 - Rc2 = R\ \text{common} + R1 + R\ Pt100 - (R1+R2) = R\ Pt100 + R\ \text{common} - R2$ Other calculations methods are possible and applied by different measuring devices, but the result is always the same: the measuring device can measure the Pt100 without any error only if the three cables have the same resistance. This becomes clear when considering the circuit shown in FIG. 3.

Measure $1 = Va/I = R\ \text{common} + R\ Pt100$ (in $R2$ the current is zero)

Measure $2 = Vb/I = R1$

Measure final $= (Va - Vb)/I = R\ \text{common} + R\ Pt100 - R1 = Pt100$ (if $R\ \text{common} = R1$)

In general, this method is a good compromise, but it assumes that the resistances of the connection cables are the same. This is usually not true. Unfortunately, the wires of an MgO cable do not have the same resistance. This is caused by the manufacturing drawing process of the wires. In these components it is common to have a resistance difference of about 1-3% of the total value that is depending on the length of the cable. For very long sensors, the total resistance could reach 20 Ohms or more depending also on the diameter of the cable, i.e., of the diameter of the internal wires.

The difference of resistance among the wires of the cable can negatively affect the measurement accuracy that can be over the requested limits.

The measurement error of a Pt100 probe can be as follows if a calibration check in ice+water reference bath at 0° C. is made:

Temperature error=($R$ $Pt$100–100)/0.39=Resistance error/0.39 0°

Class AA: max allowable T error<0.10° C.; max allowable R error<0.039Ω

Class A: max allowable T error<0.15° C.; max allowable R error<0.0585Ω

Class B: max allowable T error<0.10° C.; max allowable R error<0.117Ω

These measuring errors of the different classes are generally not achievable with very long MgO cable constructions if using the known 3 wires methods.

SUMMARY

It is an object of the present disclosure to provide a temperature probe operating according to a three-wire method, which enables highly accurate temperature measurement. Additionally, it is an object of the present disclosure to provide a method to proc To achieve this object, the present disclosure comprises a temperature probe for determining the temperature according to the three-point probe method with a sensor element providing temperature values, wherein a three-wire line of several meters, consisting of a first connecting line, a second connecting line and a third connecting line, is associated with the sensor element, wherein the connecting lines are made of a first material and serve to transmit energy and measured temperature values, wherein a conductive element made of a second material is inserted in each of the second connecting line and the third connecting line, the resistivity of said second material is greater than the resistivity of the first material, and wherein the inserted conductive elements are designed in such a way that the second connecting line and the third connecting line have substantially the same resistance as the first connecting line.

The solution according to the present disclosure is particularly applicable in connection with 3-wire cables of quite long temperature probes to ensure a preferably high accuracy class: The resistance compensation of the connecting lines is preferably reached by inserting quite short pieces of a conductive material having a higher resistivity than the material of the connecting lines in usually two of the three wires of a 3-wire cable. By inserting conductive elements of a certain length and/or diameter into two of the three wires, it is achieved that the resistance of each of the three connecting wires is equal.

According to an embodiment of the temperature probe it is proposed that the resistivity of the second material is at least five times higher than the resistivity of the first material. Preferably, the connecting lines are made of copper, and the inserted conductive elements are made of constantan. The resistance compensation is achieved by selecting the right material for the conductive element. To achieve an effective construction, a good compensation and a short length, the material must have an electrical resistivity much higher than the original wires. Most of the wires of the MgO cables are made of copper. An analysis done by comparing different materials and the resistance values that must be compensated, leads to consider Constantan as the preferred material of the conductive elements. Constantan has a high resistivity compared to e.g. copper and good and robust mechanical properties.

According to an embodiment of the temperature probe the inserted conductive elements made of the at least one second material are arranged within a transition bushing of the probe. In the transition bushing, two sections of the three-wire cable are connected together. To provide extended temperature probes, a transition bushing is generally used to connect the MgO cable to a flexible extension cable. The resistance compensating conductive elements are inserted between the end sections of the corresponding wires of the MgO cable and the flexible extension cable. They can be connected by any of the known methods, for example: welding, brazing, soldering, or crimping. Every connection can be protected by an additional polyimide film or thermo-shrinking insulation cable to isolate it from the other connections. Finally, the complete bushing may be sealed by a resin potting.

According to an alternative design of the temperature sensor, the conductive elements made of at least a second material are inserted in a connection area through which the three-wire line can be connected to external electronics: the conductive elements that compensate for the differences in resistance of the connection lines are attached to the terminals to which the connection lines of the main cable are connected. Depending on the length of the main cable, this can be the MgO cable or the flexible extension cable. The two wires into which the conductive elements are inserted may be stripped and interrupted. The conductive elements are inserted between the connecting wires and the terminals. Again, the connections can be welded, brazed, soldered, or crimped. The wires are insulated from each other, e.g., with heat shrink tubing. Additional shrink tubing insulation can be applied to protect the connection.

According to another alternative design of the temperature sensor, the conductive elements made of at least a second material are inserted in a connection area. Preferably this connection area is arranged within the flexible extension cable. The two wires into which the conductive elements are inserted may be stripped and interrupted. The conductive elements are inserted between the connecting wires and the terminals. Again, the connections can be welded, brazed, soldered, or crimped. The conductive elements and the wire connections are attached to the terminals directly like in the previous embodiment or by using a rigid support as a reinforcement.

According to an embodiment of the temperature probe, the resistance of each of the two conductive elements inserted in the second connecting line and in the third connecting line is designed in such a way that the temperature probe provides measured values with a predetermined measurement accuracy. For example, the accuracy class may be A or B.

It is further provided that the sensing element is a Resistance Temperature Detector—RTD—element, preferably a platinum measuring resistor PT100. Any other appropriate sensor element may be used in connection with the inventive solution.

With regard to the method of producing a temperature probe for determining the temperature according to the three-point probe method with a sensor element, preferably designed as a platinum measuring resistor, which provides temperature measured values, wherein a three-wire line several meters long, consisting of a first connecting line, a second connecting line and a third connecting line, is associated with the sensor element, wherein the connecting lines are made of a first material with a predetermined specific resistance and serve for transmitting energy and for transmitting the measured temperature values, the following steps are proposed:

measuring the resistance of each of the three connecting lines;

determining the connecting line with the highest resistance, hereinafter: the first connecting line;

inserting a first conductive element into the second connecting line, wherein the first conductive element is made of a second material having a resistivity greater than the resistivity of the first material, and wherein the inserted first conductive element is dimensioned such that the second connecting line has the same resistance as the first connecting line;

inserting a second conductive element into the third connecting line, wherein the second conductive element is made of the second material, and wherein the inserted second conductive element is dimensioned such that the third connecting line has the same resistance as the first connecting line.

In a development of the method the conductive elements are welded, brazed, soldered, or crimped for insertion into the corresponding connecting lines.

BRIEF DESCRIPTION OF THE DRAWINGS

The present disclosure is explained in more detail with reference to the following figures.

DETAILED DESCRIPTION

Figure 1:
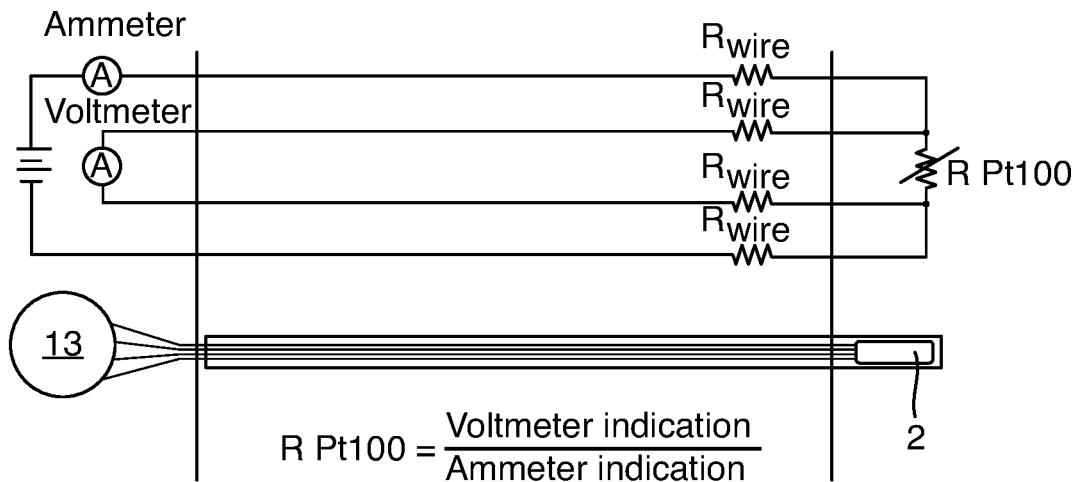
FIG. 1 shows a circuit for measuring temperature according to the 4-points-probe method, and an schematic view of a corresponding temperature probe.
Figure 2:
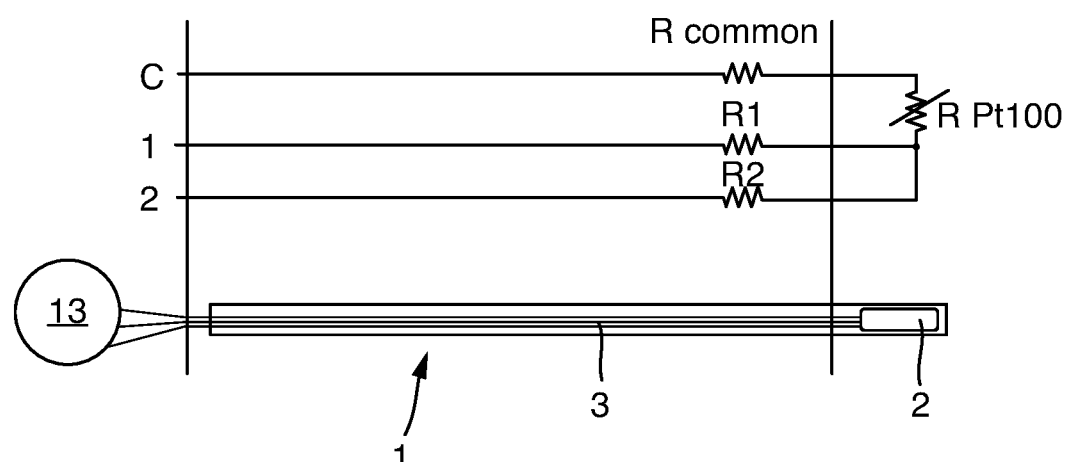
FIG. 2 shows a circuit for measuring temperature according to the 3-points-probe method, and a schematic view of a corresponding temperature probe.
Figures 3, 4:
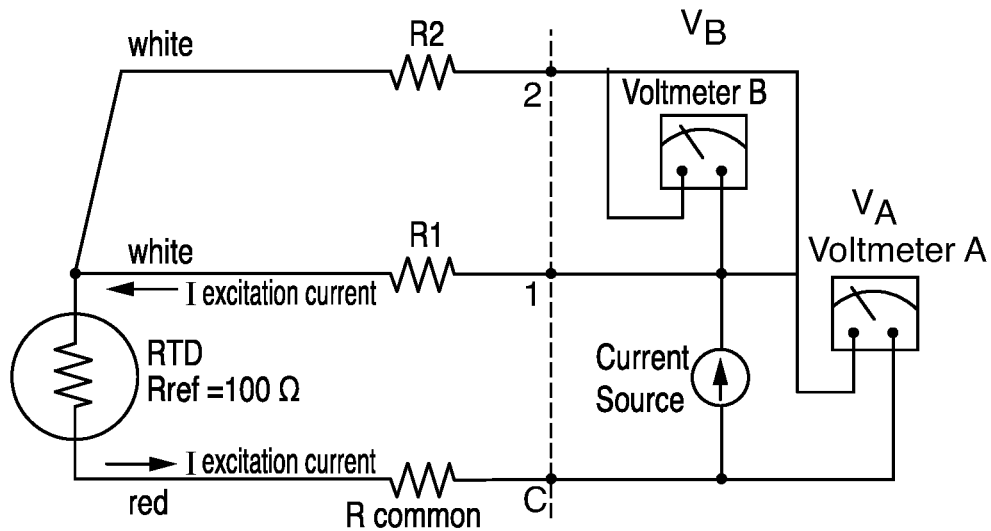
FIG. 3 shows in ore details the circuit of FIG. 2.
FIG. 4 shows a table of the measurement error as function of the length of an exemplary cable with three connecting wires.

The different prior art solutions of temperature probes 1 and the corresponding methods for measuring the temperature are already described in FIGS. 1-3.

For temperature sensors 1 with resistance thermometer elements 2, for example a Pt100, MgO cables 14 are usually used. A cable length of more than 50 m is often required to measure the temperature in a remote location. Further requirements are a predetermined high measuring accuracy (e.g., class A) and the use of a 3-wire line. Due to the technical properties of the MgO cable, it is difficult, or in some cases impossible, to reach the requested accuracy class. The problem is that the inner connecting wires 4, 5, 6 of an MgO cable 14 usually do not have the same resistance. The manufacturers generally declare an accuracy among the wires 4, 5, 6 of a three-wire cable 3 of about 0.002 Ohm/m on a typical 6 mm MgO cable 14 with a wire resistance of about 0.04-0.06 Ohm/m.

Corresponding experimental investigations have confirmed that statistically a difference in resistance of wires 4, 5, 6 with a standard deviation of about 1% of the total measured value can be expected.

FIG. 4 shows, as an example, a table visualizing the measurement error as a function of the length of a three-wire cable 3 of a temperature probe 1 with three connecting wires 4, 5, 6. In particular, the table shows the maximum cable length above which a required accuracy class A or B for the temperature measurement can no longer be maintained. So, by considering very long temperature probes 1 we have a situation like it is shown in FIG. 4: The measurement values leave a given accuracy class as soon as the connecting lines 4, 5, 6 exceed a certain length.

According to the inventive temperature probe 1 the differences of the resistances of the three connecting lines 4, 5, 6 is compensated by adding an additional resistance. Preferably, the resistances of two of the three wires 4, 5, 6 are equalized to the resistance of the connecting line (for example 4) with the highest resistance. The inventive temperature probe 1 is simple and inexpensive to manufacture, as the compensation method is less invasive, but provides a high accuracy of the temperature measurement. A piece of a conductive element 7, 8 with a higher resistivity and the determined dimensions is needed to modify the resistance of the remaining two connecting lines 5, 6 in such a way that each of the connecting lines 4, 5, 6 has the same resistance.

Figures 5, 6:
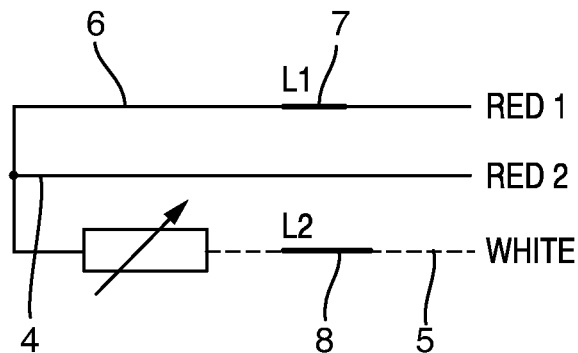
FIG. 5 shows schematically an inventive temperature probe.
FIG. 6 shows a table of the resistivity of different conductive materials.

FIG. 5 shows a schematic view of the inventive temperature probe 1 determining the temperature according to the three-point probe method. FIG. 6 shows a table of the resistivity of different conductive materials.

The calculation of the linear resistance of a connecting line 4, 5, 6 is quite simple:

Linear wire resistance=material resistivity/wire section.

By doing the calculation using a standard Constantan wire with a diameter between 0.2 and 0.5 mm we can compensate the resistance differences between the three connecting lines 4, 5, 6 of a MgO cable 14 by adding a conductive element 7, 8 of 10 mm to 50 mm of a Constantan wire.

Whereby the length of the conductive element 7, 8 is calculated by:

Compensation length=Resistance difference/Linear wire resistance.

In the following the steps for compensating resistance differences on the three wires is described:

The process starts by measuring the resistance of each of the three wires 4, 5, 6.

The wire 4 with the highest resistance is identified and the difference between the maximum value and the resistance values of the two remaining wires 5, 6 is calculated.

The compensation length of the conductive element 7, 8, preferably made of Constantan, is calculated for each of the two remaining wires 5, 6 to equalize the resistance of each of them with the resistance of the first wire 4 with the highest resistance value.

Figure 7:
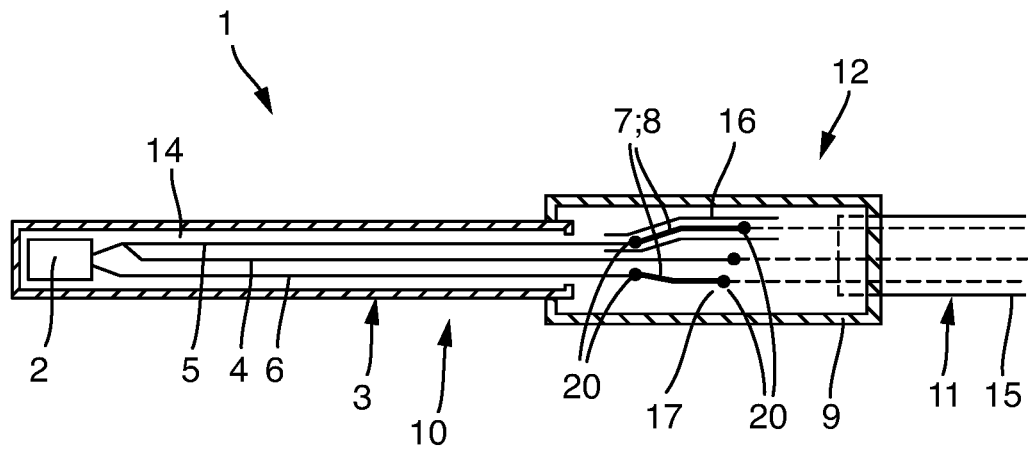
FIG. 7 shows a first embodiment of the inventive temperature probe.

FIG. 7 shows a first embodiment of the temperature probe 1 according to the present disclosure. The focus is on the attachment of the conductive elements 7, 8 to two or at least one of the connecting wires 4, 5, 6. The conductive elements 7, 8 made of the at least one second material, for example constantan, are arranged in a transition bushing 9 of the temperature probe 1. Such a transition bushing 9 serves to connect two different sections 10, 11 of the three-wire cable 3.

For extended temperature probes 1 such a transition bushing 9 is generally used to connect the MgO 14 cable to a flexible extension cable 15. The compensating conductive elements 7, 8 are inserted between the end sections of the corresponding wires of the MgO cable 14 and the flexible extension cable 15. They can be connected by any of the known methods, for example: welding, brazing, soldering, or crimping. For electrical insulation, each joint may be protected by an additional polyimide film or heat shrink insulating sleeve or cover 16. Finally, the complete bushing 9 may be sealed by a resin potting 17.

Figure 8:
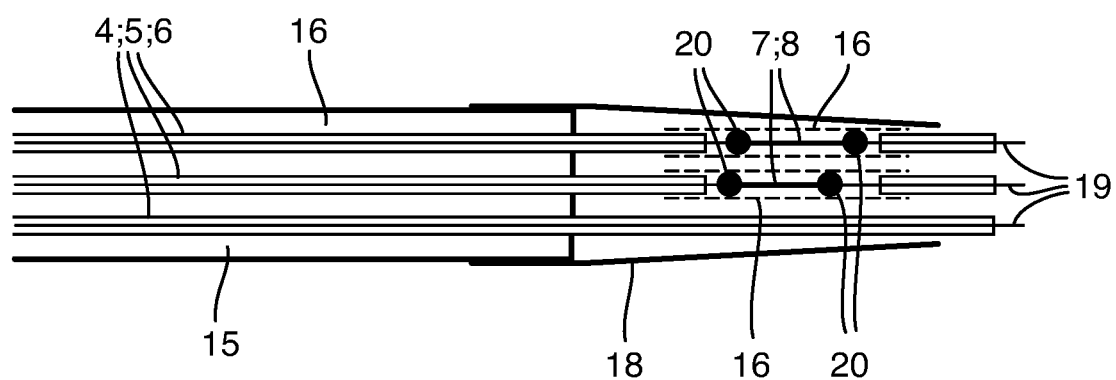
FIG. 8 shows a second embodiment of the inventive temperature probe.

FIG. 8 shows a view on a second embodiment of the inventive temperature probe. According to this alternative design of the temperature probe, the conductive elements 7, 8 made of at least a second material are inserted in a connection area 12 through which the three-wire cable 3 can be connected to external electronics 13: the conductive elements 7, 8 that compensate for the differences in resistance of the connection lines 4, 5, 6 are attached to the terminals 18 to which the connection lines 4, 5, 6 of the main cable 3 are connected. Depending on the length of the main three-wire cable 3, this may be the MgO cable 14 or the flexible extension cable 15. The two wires 4, 5, 6 into which the conductive elements 7, 8 of a determined design are inserted may be stripped and interrupted. The conductive elements 7, 8 are inserted between the connecting wires 4, 5, 6 and the terminals 18. Again, the connections can be welded, brazed, soldered, or crimped. For electrical insulation, each joint may be protected by an additional polyimide film or heat shrink insulating sleeve or cover 16. Additionally, heat shrink tubing insulation 19 can be applied to protect the connections.

Figure 9:
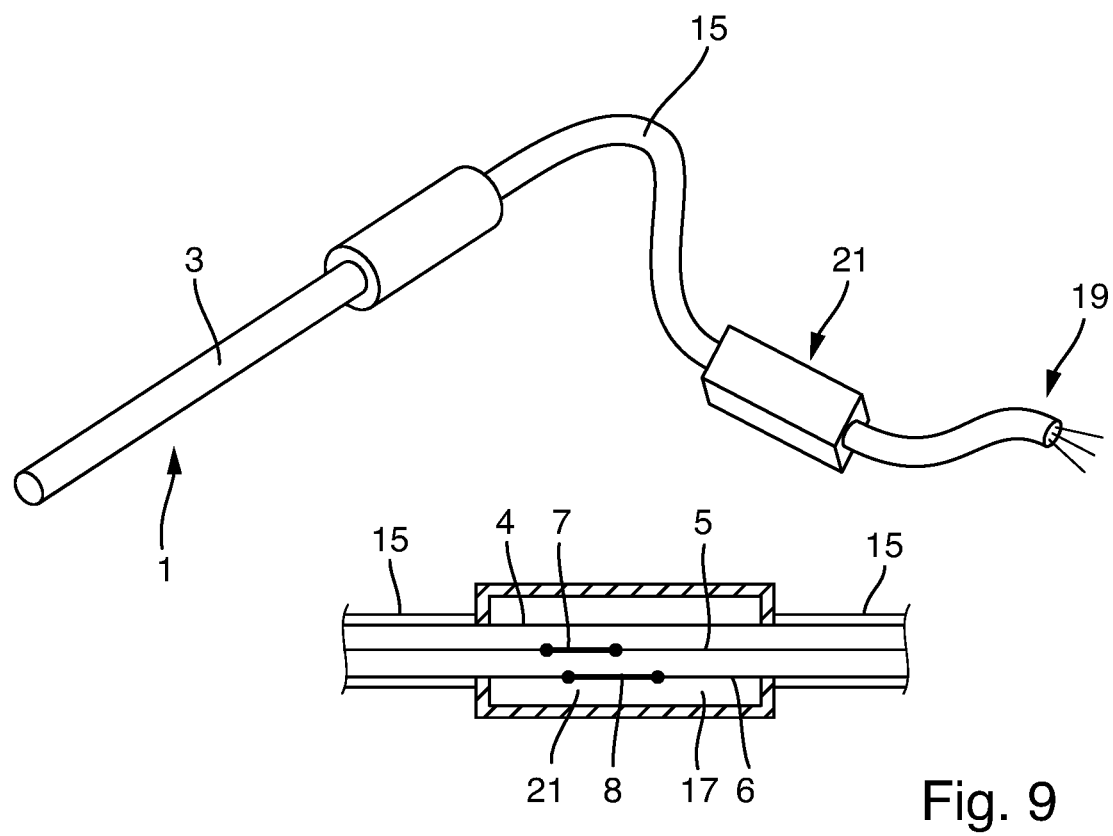
FIG. 9 shows a third embodiment of the inventive temperature probe.

FIG. 9 shows a third embodiment of the inventive temperature probe 1. Here the conductive elements, 8 made of the second material and corresponding wire connections 20 connecting the conductive elements 7, 8 to the wires 5, 6 are protected by an encapsulation box 21. The conductive elements 7, 8 and the wire connections 20 are protected by an encapsulation box 21. Preferably tis encapsulation box is inserted in the flexible extension cable 15. They can also be directly inserted into the terminal part 19 by which the temperature probe 1 is connected to an external electronics (13). The conductive elements 7, 8 and the wire connections 20 are inserted into proper heat shrink tubing 16 or an insulating tape. Then the connection area 12 is protected by an additional encapsulation box 21. The connection area 12 may be at the end or in the middle of the flexible extension cable 15.

The invention claimed is:

1. A temperature probe for determining a temperature according to a three-point probe method, the temperature probe comprising:
    a sensor element embodied to provide temperature values;
    a three-wire line several meters long, the three-wire line including:
        a first connecting line;
        a second connecting line; and
        a third connecting line,
        wherein the three-wire line is connected to the sensor element, and
        wherein each of the three connecting lines is made of a first material and serves to transmit energy and measured temperature values;
    a first conductive element made of a second material and inserted in the second connecting line; and
    a second conductive element made of the second material and inserted in the third connecting line,
    wherein a resistivity of the second material is higher than a resistivity of the first material, and
    wherein the two inserted conductive elements are designed such that the second connecting line and the third connecting line have a same resistance as the first connecting line.

2. The temperature probe according to claim 1, wherein the resistivity of the second material is at least 5 times higher than the resistivity of the first material.

3. The temperature probe according to claim 2, wherein the three connecting lines are made of copper, and wherein the two inserted conductive elements are made of constantan.

4. The temperature probe according to claim 1, wherein the two inserted conductive elements made of the second material are arranged within a bushing where two sections of the three-wire line are interconnected.

5. The temperature probe according to claim 1, wherein the two conductive elements made of the second material are arranged in a connection area via which the three-wire line is connectable to external electronics.

6. The temperature probe according to claim 1, wherein the resistance of the two conductive elements inserted in the second connecting line and in the third connecting line is designed such that the temperature probe provides measured values with a predetermined measurement accuracy.

7. The temperature probe according to claim 1, wherein the sensing element is a Resistance Temperature Detector (RTD) element.

8. A method of manufacturing a temperature probe for determining a temperature according to a three-point probe method with a sensor element designed as a platinum measuring resistor that provides temperature measured values, wherein a three-wire line several meters long having a first connecting line, a second connecting line, and a third connecting line is associated with the sensor element, wherein the three connecting lines are made of a first material with a predetermined specific resistance and serve for transmitting energy and for transmitting the measured temperature values, the method comprising:
    measuring a resistance of each of the three connecting lines;
    determining a connecting line having the highest resistance, hereinafter: the first connecting line;
    inserting a first conductive element into the second connecting line, wherein the first conductive element is made of a second material having a resistivity greater than the resistivity of the first material, and wherein the inserted first conductive element is dimensioned such that the second connecting line has the same resistance as the first connecting line;
    inserting a second conductive element into the third connecting line, wherein the second conductive element is made of the second material, and wherein the inserted second conductive element is dimensioned such that the third connecting line has the same resistance as the first connecting line.

9. The method according to claim 8, wherein the two conductive elements are welded, brazed, soldered, or crimped for insertion into the corresponding connecting lines.

10. The method according to claim 8,
wherein the inserted conductive elements made of the second material are arranged within a bushing where two sections of the three-wire line are interconnected.

11. The method according to claim 8,
wherein the inserted conductive elements made of the second material are arranged in a connection area via which the three-wire line is connectable to external electronics.

12. The method according to claim 8,
wherein the conductive elements made of the second material and corresponding wire connections connecting the conductive elements to the wires are protected by an encapsulation box, whereby the conductive elements protected by the encapsulation box are inserted in a flexible extension cable.

* * * * *